Aug. 2, 1960     P. J. FAZIO     2,947,585
ELEVATING TRAY FOR AUTOMOBILES
Filed April 29, 1958     2 Sheets-Sheet 1
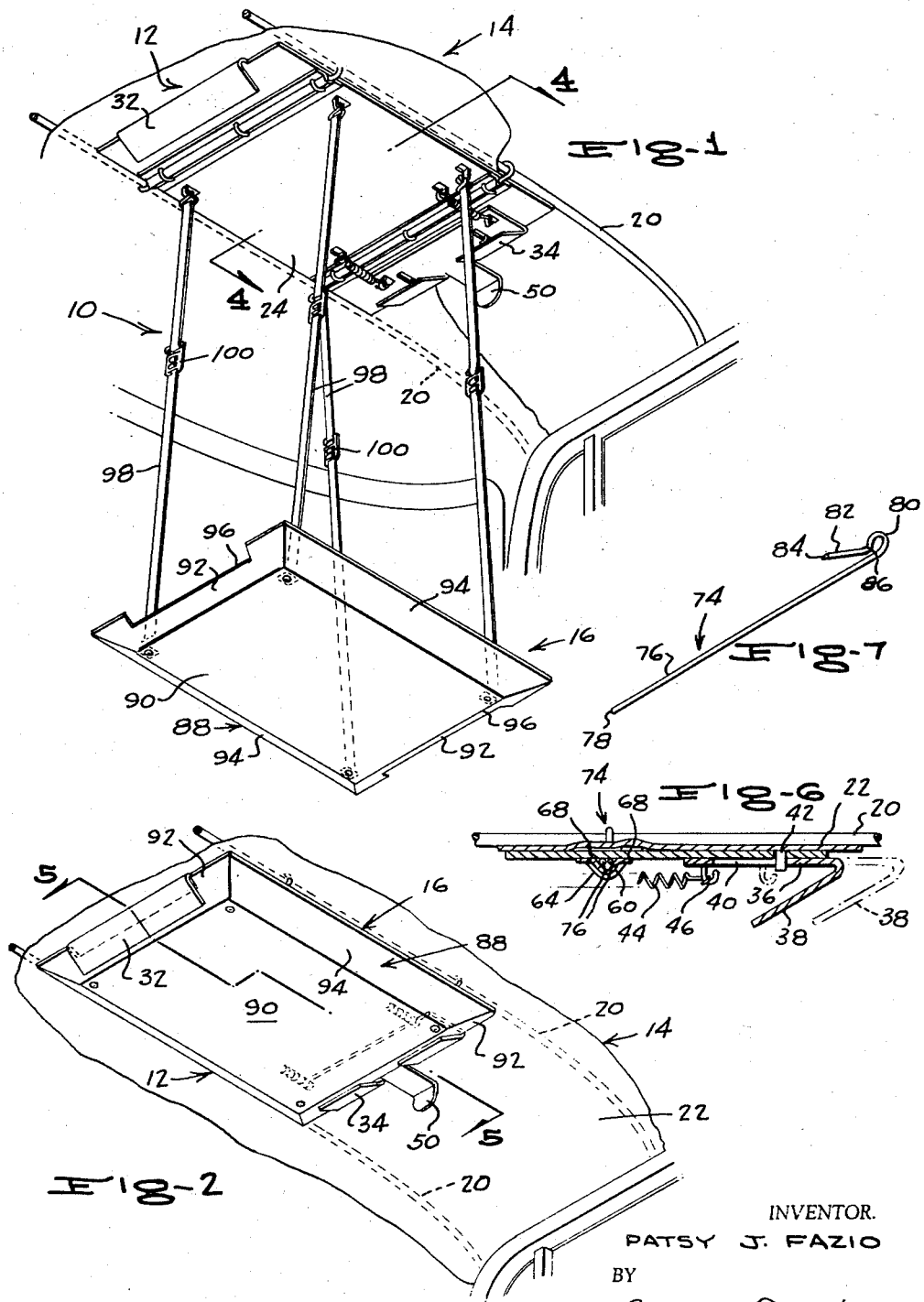
INVENTOR.
PATSY J. FAZIO
BY
*McMorrow, Berman & Davidson*
ATTORNEYS Aug. 2, 1960 P. J. FAZIO 2,947,585
ELEVATING TRAY FOR AUTOMOBILES
Filed April 29, 1958 2 Sheets-Sheet 2
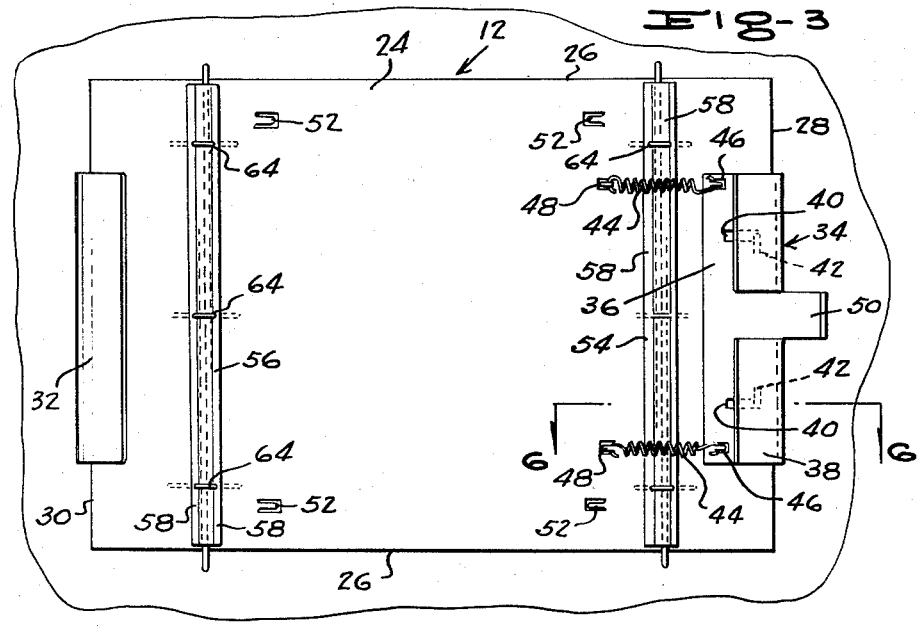
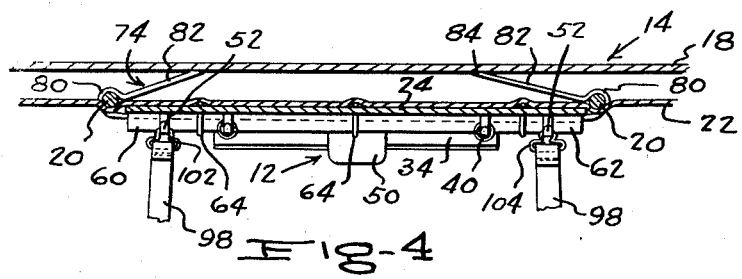
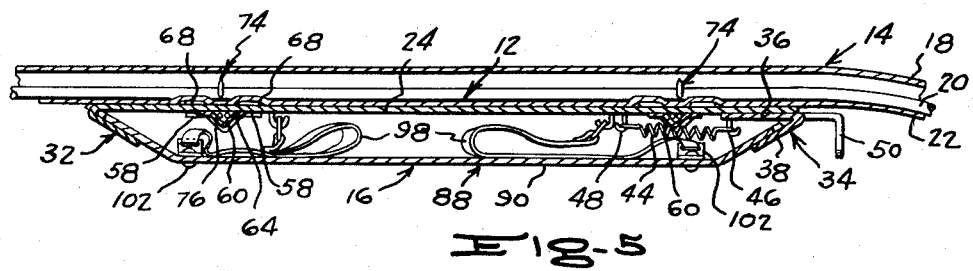
INVENTOR.
PATSY J. FAZIO
BY
McMorrow, Berman & Davidson
ATTORNEYS

United States Patent Office 2,947,585
Patented Aug. 2, 1960

2,947,585

ELEVATING TRAY FOR AUTOMOBILES

Patsy J. Fazio, 3929 Vista Granda Drive,
San Diego, Calif.

Filed Apr. 29, 1958, Ser. No. 731,750

3 Claims. (Cl. 311—21)

This invention relates to improvements in elevatable service devices for use in automobiles and the like, and more particularly to an improved elevating tray which is suspended from the roof or top within an automobile body and is adapted to be stored at roof level and brought down to use level when desired.

The primary object of the invention is to provide a more practical and efficient and more easily installed device of this kind which involves a base assembly which is adapted to be secured to roof or top ribs of an automobile and disposed at the underside of the lining of the roof, with minimum mutilation of the lining, the base assembly having thereon simple releasable spring-pressed retaining means for a tray which is suspended from the base assembly by flexible straps.

Another object of the invention is to provide a device of the character indicated above which is comprised of a small number of simple and easily assembled parts, and which can be made in attractive and rugged forms at relatively low cost.

Other important objects and advantageous features of the invention will be apparent from the following description in the accompanying drawings, wherein, for purposes of illustration only, a specific form of the invention is set forth in detail.

In the drawings:

Figure 1 is a perspective view showing a device of the invention installed in a passenger automobile, and in use position, the roof lining being broken away to show mounting of the device on roof ribs;

Figure 2 is a perspective view, similar to Figure 1, showing the tray in elevated stored position;

Figure 3 is an enlarged bottom plan view of the base assembly;

Figure 4 is an enlarged fragmentary vertical transverse section taken on the line 4—4 of Figure 1;

Figure 5 is an enlarged fragmentary vertical longitudinal section taken on line 5—5 of Figure 2;

Figure 6 is an enlarged fragmentary vertical longitudinal section taken on the line 6—6 of Figure 3; and Figure 7 is a perspective view of a base assembly mounting hook.

Referring in detail to the drawings, wherein like numerals designate like parts throughout the several views, the illustrated tray, generally designated 10, consists of a base assembly 12, adapted to be mounted beneath the roof or top 14 of an automobile, and tray assembly 16, which is secured to the base assembly 12 when not in use, and is suspended from and below the base assembly when in use.

The roof or top 14 of an automobile usually involves a metal top plate 18, laterally spaced longitudinal ribs 20, of round or triangular cross section, which are spaced downwardly from and parallel to the plate 18, and a fabric or plastic flexible lining 22 which is stretched across the roof 14 and between and on the level of the ribs 20. The lining 22 sometimes has tubular seams enclosing the ribs 20.

The base assembly 12 comprises a longitudinally elongated and preferably rectangular base plate 24 having side edges 26 and forward and rear end edges 28 and 30, respectively. The base plate 24 is relatively thin and stiff or rigid and can be made of metal or of such as suitable plastic.

On the rear edge 30 of the base plate 24 is a forwardly declining fixed tray-clamping jaw 32 which is narrower than the plate 24 and is spaced at its ends from the side edges 26 of the plate 24. At the front end of and beneath the base plate 24 is a movable tray-clamping jaw 34 which involves a horizontal transversely elongated flange 36, bearing slidably against the underside of the base plate, and a rearwardly declining flange 38 of substantially the same form and width as and facing the fixed jaw 32. Transversely spaced longitudinal slots 40 in the flange 36 receive hooks 42 fixed to and depending from the base plate and mounting the movable jaw 34 on the base plate for forward and rearward movement, relative to the base plate, between clamping position and retracted position. Urging the movable jaw 34 rearwardly to clamping position are contractile springs 44 which are secured to and stretched between ears 46 depending from the flange 36 and fixed ears 48 depending from the base plate 24 to the rear of the movable jaw 34.

For retracting the movable jaw 34 forwardly, against the resistance of the springs 44, the declining flange 38 is mutilated to provide a central, forwardly projecting horizontal and relatively wide, reclining L-shaped fingerpiece 50.

Pairs of laterally spaced hooks 52 are cut out of the material of the base plate 24 and depend therebelow, to which tray-suspending straps are secured, as hereinafter described, the pairs of hooks 52 being spaced at substantial distances inwardly from the end edges of the base plate and being close to the side edges of the base plate, as shown in Figure 3.

For mounting the base plate 24 to the underside of an automobile roof 14, the base plate 24 being preferably of a width to substantially reach between two adjacent roof ribs 20, as shown in Figures 1 and 4, there are provided preferably two transversely elongated mounting bars 54 and 56, which are the same in length as the width of the base plate and are secured against the underside thereof at points close to and spaced rearwardly of the movable jaw 34 and the fixed or stationary jaw 32, respectively.

The bars 54 and 56 comprise coplanar side flanges 58 at opposite sides of central longitudinal, upwardly facing channels 60. When the bars 54 and 56 are in place on the underside of the base plate 24, the channels 60, with the underside of the plate 24 define half-round tubes 62, open at their ends to frictionally receive side-by-side portions of mounting hooks as hereinafter described.

The mounting bars 54 and 56 can be fixed in place in any suitable manner, but for economy and easy assembly, these bars are secured to the base plate 24 by means of sets of initially U-shaped soft bendable wire clips 64, spaced along and embracing the bars, with their legs 68 inserted upwardly through aligned openings in the side flanges 58 and the plate 24, respectively, and bent down upon the upper side of the plate 24, as shown in Figure 6.

The base assembly 12 having been provided as above described, the base plate 24 is then positioned between two selected roof ribs 20, at the proper location longitudinally of the roof 14 for positioning the tray assembly 16 at the desired location within the automobile when the tray is suspended from the base assembly 12 for use, and the base assembly 12 is then held up against the lining 22 and secured in place by means of mounting hooks 74, two for each of the mounting bars 54, 56, Each of the mounting hooks 74, as shown in Figure 7, consists of a preferably round spring metal rod, of a gauge to fit snugly and be frictionally retained in the tubes 62 formed by the mounting bar channels 60, the rod being bent to provide a relatively long straight shank 76 having a free inner end 78 and an outer end which merges into an upwardly and inwardly curved hook portion 80 which in turn terminates in an upwardly and inwardly inclined pin 82 having a pointed terminal end 84. The apertures of the hook portions 80 are sized so that they require to be spread to be engaged over the roof ribs 20 and frictionally engaged thereon. The shanks 76 of the mounting hooks 74 are inserted part way into related ends of the tubes 62 in side-by-side relation preparatory to finally installing the base assembly 12.

With the base plate 12 held up in place, the hooks 74 are pushed into the tubes 62, in such a way that the pins 82 pierce the lining 22 at the outer sides of the ribs 20 and ride inwardly upon the upper sides of the ribs 20, and serve to spread the hook portions 80 into the ribs 20, until the hook portions 80 come into firm embracing relation around the ribs 20 and securely hold the base plate 24 in place. As shown in Figure 4, the ends 86 of the hook portions 80 adjacent to the pins 82 are held against the inward sides of the ribs 20 by engagement of the pointed ends 84 with the underside of the top roof plate 18 and resist shifting of the hooks 74 out of place on the ribs.

The tray assembly 16 comprises a preferably rectangular tray 88 having a flat bottom 90, and flared end and side walls 92 and 94, respectively. The tray 88 can be wider than the base plate 24, if desired. As shown in Figure 1, cut-outs 96 may be provided in the upper edges of the side walls 94, facilitating handling of the tray, and facilitating its application to and removal from the base assembly 12, the tray 88 being wide enough to conceal the base assembly 12, except for the jaws 32 and 34.

The tray assembly 16 further comprises vertically extensible and contractible flexible suspending straps 98, composed of sections adjustably connected by buckles 100. The lower ends of the straps 98 are preferably secured through ears 102 secured to and upstanding from the tray bottom 90 at the corners thereof, while the upper ends of the straps 98 have thereon metal loops 104 which are removably engaged over related ones of the base plate hooks 52, so as to suspend the tray 88 from the base plate 24, as shown in Figure 1.

When not in use, the tray assembly 16 is stored at the underside of the base assembly 12 and the base assembly is concealed by raising the tray 88 with one hand in such a manner that the straps 98 fold down into the tray 88, as shown in Figure 5, as the tray is raised toward registry with the base plate 24. With the movable jaw 34 retracted forwardly with the other hand, by means of the finger-piece 50, the rearward end wall of the tray 88 is conformably engaged into the rear fixed jaw 32 and against the undersisde of the base plate 24 and the forward end wall of the tray 88 against the flange 38 of the movable jaw 34, whereat the movable jaw 34 is released and the springs 44 contract and force the declining flange 38 conformably beneath the forward end wall of the tray 88 and hold the tray 88 securely in place between the jaws 32 and 34. Subsequent retraction of the movable jaw 34 frees the tray assembly 16 to be lowered into its position of use.

Although I have shown and described herein a specific form of my invention, it is to be understood that any change or changes in the structure and in the relative arrangements of the components are contemplated as being within the spirit and scope of the invention as defined by the claims appended hereto.

What is claimed is:

1. In combination, an automobile roof having a top plate, laterally spaced longitudinal ribs spaced beneath said top plate, and a flexible lining extending across and between and supportably engaging said ribs, a base assembly comprising a base plate extending between adjacent ribs and bearing against the underside of said lining, spaced elongated mounting bars extending crosswise of the under side of said base plate between the opposite ends of said base plate and secured to said base plate, spaced mounting hooks on each of said mounting bars, each hook including a shank fixed to the adjacent mounting bar and a resilient hook portion clampably embracing an adjacent roof rib, releasable jaws on the opposite ends of said base plate, a tray assembly comprising a pan-shaped tray, and flexible means secured to the base plate and to said tray for suspending the tray from and below the base plate, said tray being adapted to be elevated to engage said base assembly with said jaws securing the tray in engagement with the base assembly in storage position.

2. The combination of claim 1, wherein said releasable jaws comprises a fixed depending jaw on one end of said base plate, and a depending movable jaw facing the fixed jaw at the other end of the base plate, means supporting the movable jaw on the base plate for movement toward and away from the fixed jaw, and spring means urging the movable jaw toward the fixed jaw, said jaws being severally engageable with opposite ends of the tray.

3. In combination, an automobile roof having a top plate, laterally spaced longitudinal ribs spaced beneath said top plate, and a flexible lining extending across and between and supportably engaging said ribs, a base assembly comprising a base plate extending between adjacent ribs and bearing against the under side of said lining, mounting means for said base plate comprising hook means connected to the base plate and engaged over the ribs, releasable jaw means on said plate, a tray assembly comprising a pan-shaped tray, and flexible means secured to the base plate and to said tray for suspending the tray from and below the base plate, said tray being adapted to be elevated to engage said base assembly with said jaw means securing the tray in engagement with the base assembly in storage position, said mounting means comprising channel bars extending crosswise of the underside of said base plate at spaced points inwardly of the fixed and movable jaws, means securing the channel bars on the base plate, said channel bars and said base plate together defining tubes having open outer ends, and hook means having shanks frictionally inserted in the open ends of said tubes and resilient hook portions clampably embracing related roof ribs, said hook portions terminating in pins piercing the roof lining in advance of engagement of the hook portions over the roof ribs, said hook portions extending upwardly and inwardly relative to the shanks and being initially smaller in aperture than the ribs, and said pins being upwardly and inwardly inclined relative to the shanks so as to serve as cams to ride over the roof ribs and spread the hook portions around the roof ribs as the shanks are inserted into said tubes, said pins having free ends bearing against the underside of the roof top plate and holding the hook portions closed and in embracing relation to the roof ribs.

References Cited in the file of this patent

UNITED STATES PATENTS

| | | |
|---|---|---|
| 764,232 | Eustis | July 5, 1904 |
| 1,819,516 | Kelley | Aug. 18, 1931 |
| 1,928,731 | Mattson | Oct. 3, 1933 |
| 1,964,339 | Brassell | June 26, 1934 |
| 2,151,964 | Gay | Mar. 28, 1939 |
| 2,829,813 | Sebell | Apr. 8, 1958 |

FOREIGN PATENTS

| | | |
|---|---|---|
| 439,898 | Great Britain | Dec. 17, 1935 |